United States Patent [19]

Lewandowski

[11] 4,431,277
[45] Feb. 14, 1984

[54] VIEWING DEVICE

[76] Inventor: Marion H. Lewandowski, 10500 Whitehill, Detroit, Mich. 48224

[21] Appl. No.: 318,058

[22] Filed: Nov. 4, 1981

[51] Int. Cl.³ ............................................. G02B 23/02
[52] U.S. Cl. ..................................... 350/574; 350/319
[58] Field of Search ............... 350/574, 575, 577, 453, 350/319

[56] References Cited

U.S. PATENT DOCUMENTS 3,558,220  1/1971  Werner .
3,910,676 10/1975  Fojtik et al. ......................... 350/575
3,973,835  8/1976  Miyakawa et al. .
4,116,529  9/1978  Yamaguchi .
4,257,670  3/1981  Legrand .

Primary Examiner—William L. Sikes
Assistant Examiner—Matthew W. Koren
Attorney, Agent, or Firm—Gifford, VanOphem, Sheridan & Sprinkle

[57] ABSTRACT

A viewing device for mounting in a wall or door frame to provide a view of the exterior of the building to an occupant of the building comprises a tubular housing and a pair of reflectors mounted by arms at one axial end of the housing so that they extend axially outward from the housing. The device further includes a transparent view housing which encloses the reflectors and prevents rearrangement of the reflectors while at the same time permitting a clear view of the area directly in front of the housing. The interior end of the tubular housing is enclosed by an eyepiece which can preferably be a magnifying type lens to increase the size of the images reflected from the reflectors and perceived through the transparent view housing.

9 Claims, 4 Drawing Figures

VIEWING DEVICE

BACKGROUND OF THE INVENTION

I. Field of the Present Invention

The present invention relates generally to viewing devices which enable an occupant of a building to view an exterior area adjacent the building, and more particularly, to such a device which reflects a visual image of the building area directly adjacent to the building wall.

II. Description of the Prior Art

As a security measure, it has previously been known to provide a peephole in a door so that an occupant can view a caller before deciding to open the door and admitting the caller to the premises. Of course, the simplest type of viewing devices is a peephole which permits the occupant to identify a person standing immediately in front of the peephole. Such devices are disadvantageous in that the field of view is limited to the area which is directly in front of the peephole, and thus, the position of the peephole determines the rather limited area which can be viewed. As a result, short people may not be visible through the peephole and faces of taller people may not be visible through the peephole.

One previously known means for increasing the field of view is a viewing device such as that described in U.S. Pat. No. 4,116,529 to Yamaguchi. The device includes a tubular body which is mounted in a door. The exterior end of the housing includes a wide angle lens so that a wide area is reflected rearwardly toward the eyepiece at the other end of the housing. Although such a device substantially increases the range of vision to a person standing at the inside of the door, the angle from which light can be reflected toward the lens is limited such that areas directly below the door and to the sides of the door cannot be viewed. Consequently, a person could stand closely against the side of the building to the side or below the viewing device and remain undetected by the wide angle lens.

Another previously known device which attempts to overcome the blind spots existing in previously known viewing devices is shown in the U.S. Pat. No. 3,973,835 to Miyakawa et al. Miyakawa et al discloses a viewing device having a tubular body which extends through the door and extends past the outer surface of the door. The outwardly extending portion is housed in a clear plastic bubble having a darkened upper surface. The outer, extended portion of the tubular housing further includes a transverse viewing port and reflectively coated glass plate 22 is mounted in the housing at an angle to the viewing port. The reflective plate also extends across a lens secured at the exterior end of the housing. When the housing is rotated so that the viewing port faces the darkened portion of the bubble, no light is reflected in the reflective glass plate and the viewer is able to see through the glass the image reflected through the exterior lens, and is thus able to view the area directly in front of the door. The housing can then be rotated so that the viewing port faces the bottom or a side of the bubble. The light is then reflected by the reflective glass plate toward the viewer so that the viewer is able to see the area directly beneath the viewer or directly to the side of the viewer adjacent the building wall. However, such a device is disadvantageous since the housing must be rotated in order to change the field of vision to provide a view of the area directly below or aside the line of the sight of the viewer. Consequently, all areas adjacent to the door are not simultaneously visible to the occupant. Moreover, the rotational movement of the housing can be detected through the clear plastic bubble and thus, alerts the caller to the fact that the caller is being viewed by an occupant of the building.

SUMMARY OF THE PRESENT INVENTION

The present invention overcomes the above-mentioned disadvantages by providing a viewing device in which a pair of reflectors extending outwardly from the exterior surface of the building are arranged at predetermined angles so that the area directly below and directly to the sides of the viewing device is simultaneously viewed. The reflectors are enclosed in a transparent housing to prevent tampering with the alignment of the reflectors and to protect them from weather conditions. Preferably, the reflectors are small enough to provide a partially unobstructed view of the area in front of the device.

The device generally includes a tubular housing which is mounted in a door frame, wall or the like so that it provides a field of view in front of as well as substantially along the entire face of the building. The inner end of the housing includes an eyepiece. The eyepiece preferably comprises a magnifying lens. Other advantages and details of the present invention will be disclosed in the detailed description of a preferred embodiment of the present invention.

BRIEF DESCRIPTION OF THE DRAWING

The present invention will be more clearly understood by reference to the following detailed description when read in conjunction with the accompanying drawing in which like reference characters refer to like parts throughout the several views and in which.

DETAILED DESCRIPTION OF A PREFERRED EMBODIMENT OF THE PRESENT INVENTION

Figure 1:
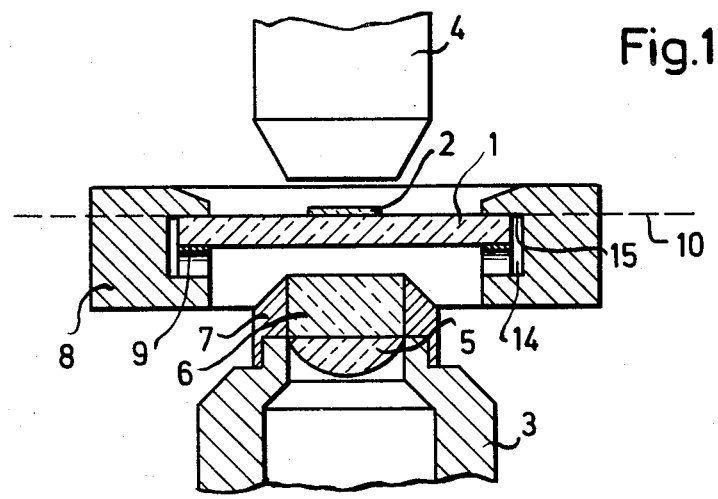
FIG. 1 is a top plan view shown a viewing device according to the present invention installed in a door frame.

Referring first to FIG. 1, the viewing device 10 of the present invention is thereshown mounted in a door frame 11 adjacent the door 14 in a building wall 16. The device 10 permits the occupant 18 to view a caller 20 standing on the porch 22 in front of the door 14. In addition, the caller 18 can view toward the left and right in FIG. 1 along the exterior surface of the wall 16 and below the porch 22 to assure that no one is waiting in surprise when the occupant 18 opens the door to admit the caller 20.

Figure 2:
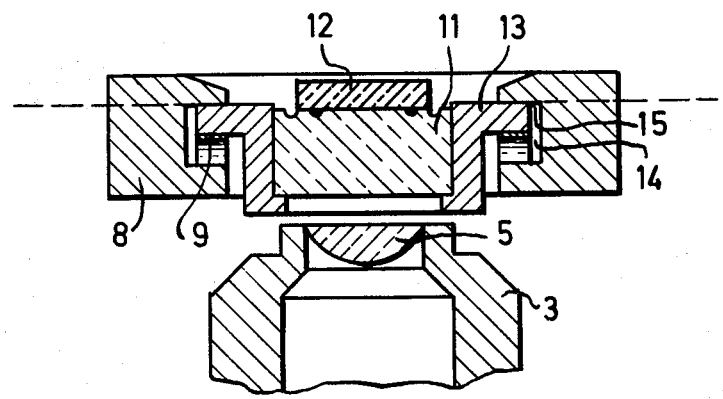
FIG. 2 is a sectional view of the viewing device shown in FIG. 1.
Figure 3:
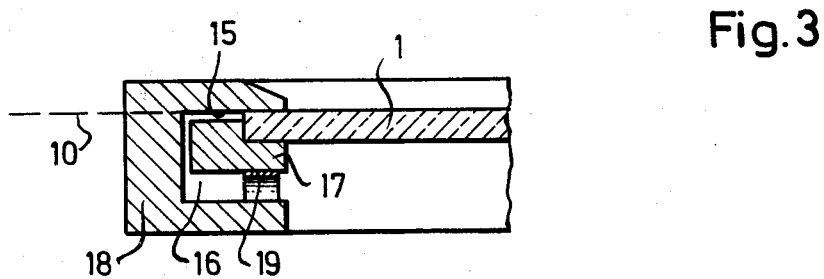
FIG. 3 is an exploded perspective view of the device shown in FIGS. 1 and 2.

As best shown in FIGS. 2 and 3, the viewing device 10 comprises a tubular housing 24 extending through structural members 26 and 28 of the door frame 12. The housing 24 comprises a first tubular member 30 and a second tubular member 32 which is appropriately dimensioned to fit within the first tubular member 30. Preferably, the tubular member 30 includes an interiorly threaded portion 34 which engages the correspondingly threaded external portion 36 of the tubular member 32. Such a connection permits the length of the housing 24 to be adjusted so that the length of the housing corresponds with the width of the door frame or wall structure through which the device is installed.

The unthreaded end of the tubular member 30 includes a radially extending flange 38 having through-bores 40 to permit fasteners such as the screws 42 to secure the housing to the interior wall 27 of the interior frame structure 26. That end also includes an eyepiece 44 which encloses the interior end of the housing 24. Preferably the eyepiece 44 is a magnifying lens to provide a larger image to the occupant 18. A seal ring 46 can be conveniently fastened intermediate the surface 27 of the frame structure 26 and the radially extending flange 38 to provide a weather tight seal around the opening which receives the tubular member 30.

Figure 4:
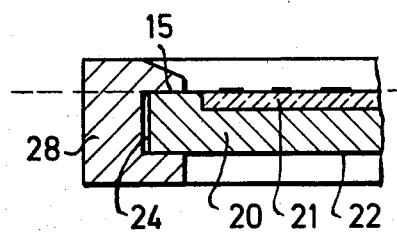
FIG. 4 is a sectional view taken substantially along the line 4—4 in FIG. 2.
Figure 5:
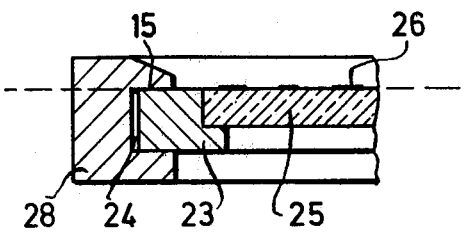
Figure 6:
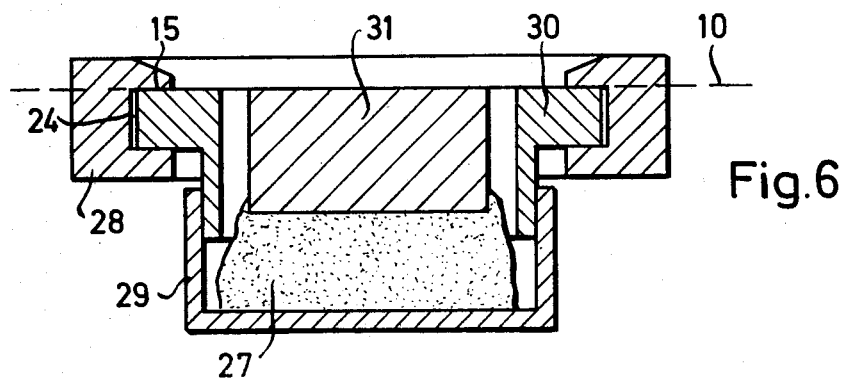
Figure 7:
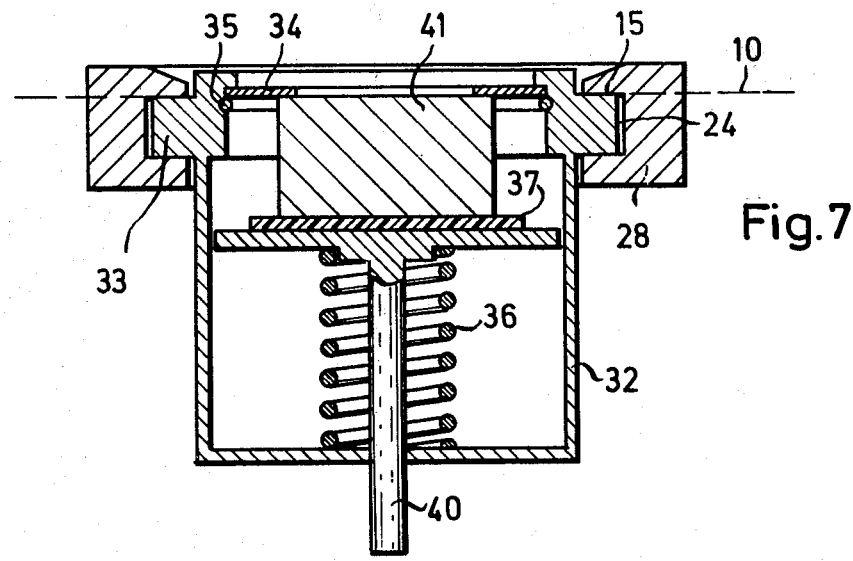
Figure 8:
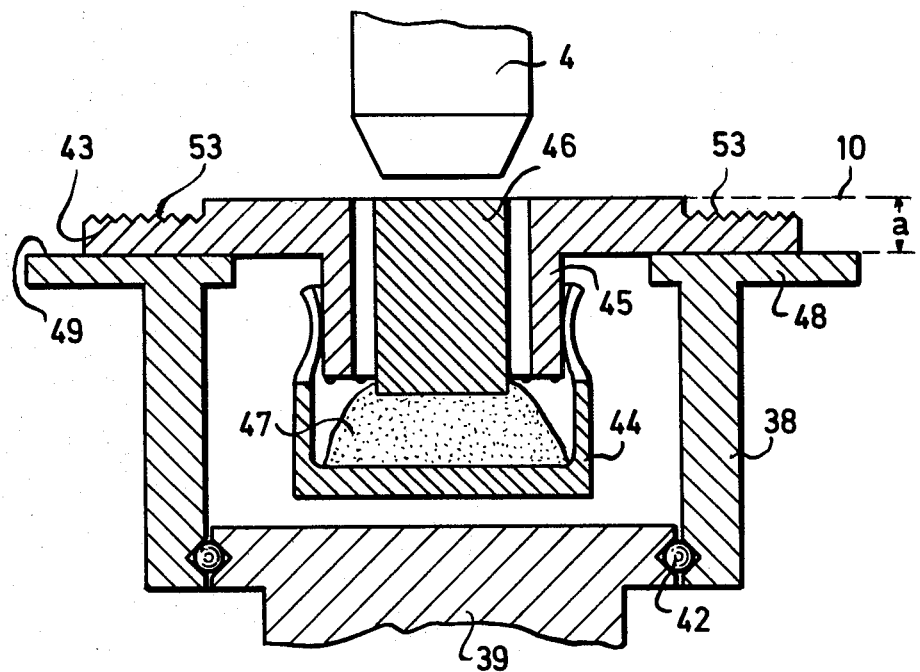
Figure 9:
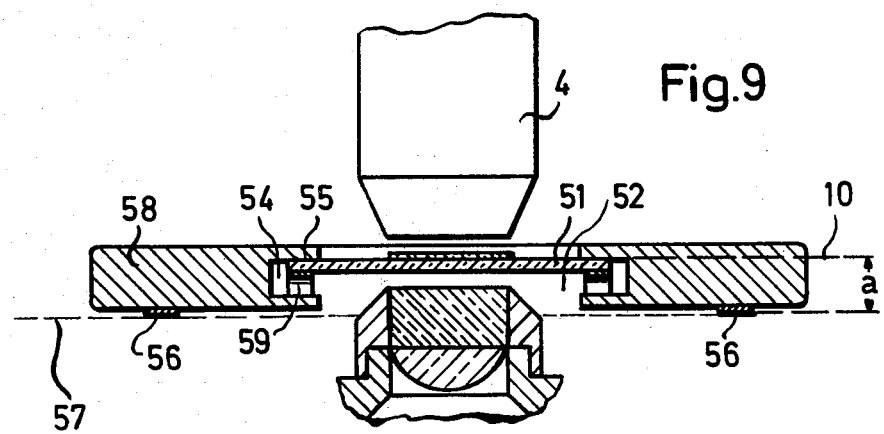
Figure 1:
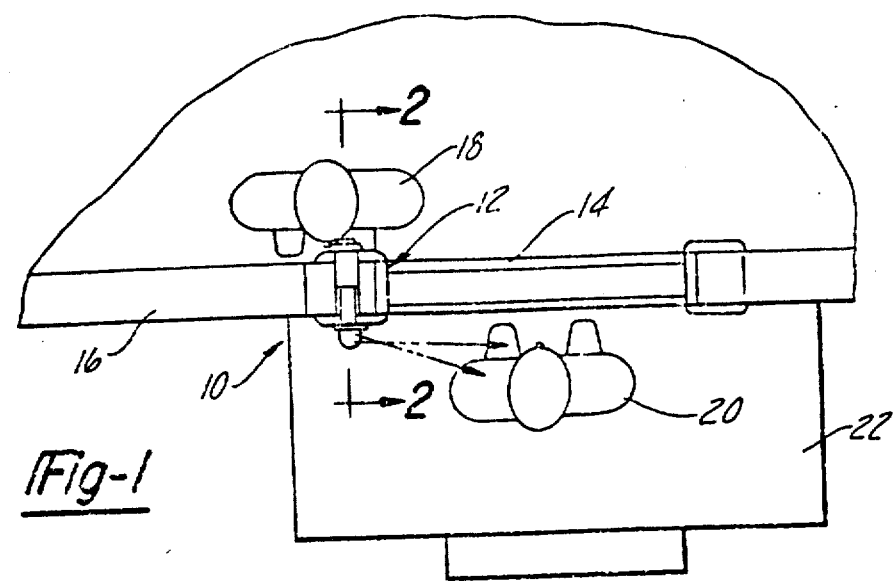
Figure 2:
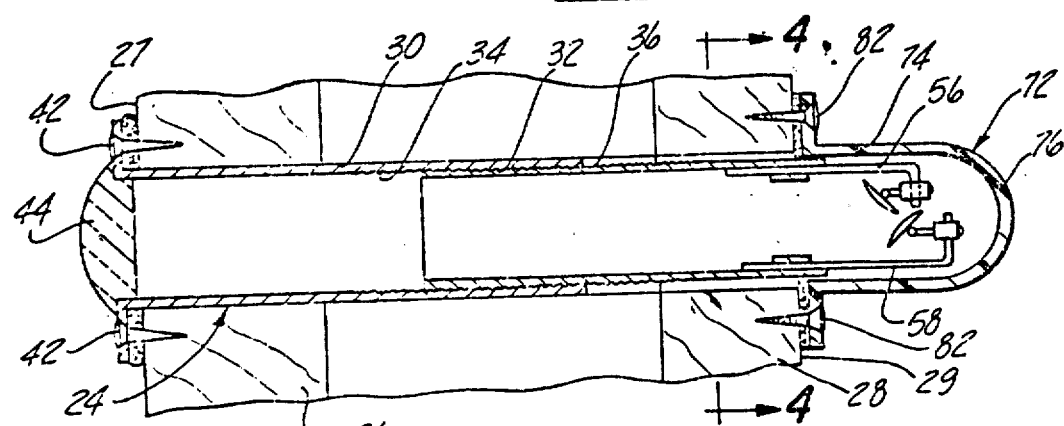
Figure 3:
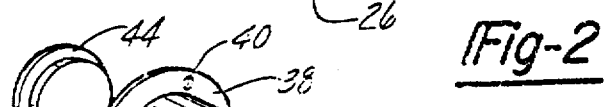
Figure 4:
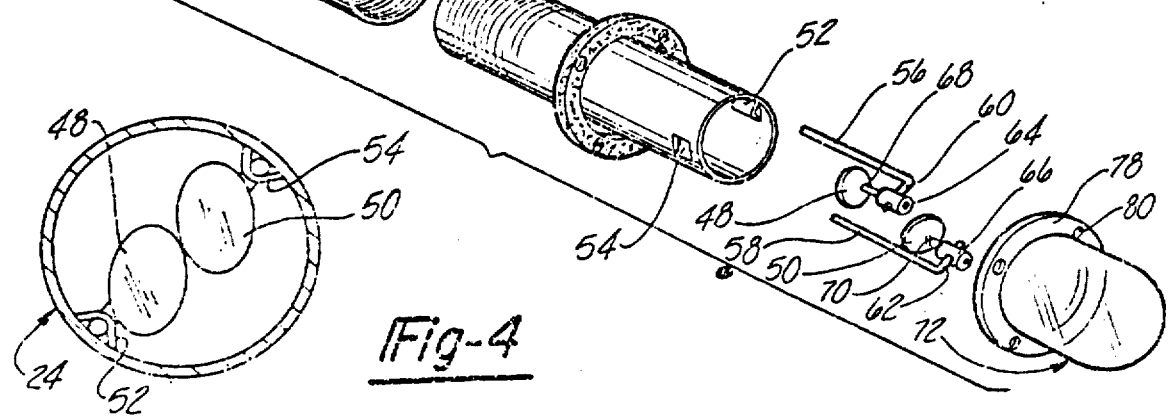

The unthreaded end of tubular member 32 includes means for securing the pair of reflectors 48 and 50 in a position axially extended from the ends of tubular member 32. As shown, the end of the tubular member 32 includes a pair of diametrically opposed indentations 52 and 54 which form apertures adapted to receive the elongated stems 56 and 58. Preferably, when the housing 24 is installed, one of the indentations is disposed above the longitudinal axis of the housing 24 while the other indentation is disposed below the longitudinal axis of the housing 24 so that as shown in FIG. 4, the reflectors are not aligned directly adjacent to each other such that each would block the view reflected by the other.

The stems 56 and 58 include angled arm portions 60 and 62, respectively, which extend toward the center of the tubular housing 24. Each arm portion 60 and 62 is secured to a mirror support arm 64 and 66, respectively. The mirror support arms 64 and 66 support the reflectors 48 and 50, which are preferably in the form of wide angle mirrors, by means of ball and socket connections 68 and 70 respectively. The arms 64 and 66 are slidably adjustable along the arms 60 and 62 respectively so that the reflectors 48 and 50 can be initially radially adjusted with respect to the longitudinal axis of the housing 24. Preferably, the support arms 64 and 66 are substantially aligned on the longitudinal axis so that regardless of the angle at which the reflectors 48 and 50 are disposed by the ball and socket joints 68 and 70, the reflectors 48 and 50 do not obstruct one another so as to reflect images from one to the other. However, the adjustment of the mirrors will be described in more detail hereinafter.

The device 10 also includes an exterior housing 72 comprising a first transparent cylindrical portion 74 and a substantially hemi-spherical, transparent end portion 76 secured to one end of the cylindrical portion 74. The other end of the cylindrical portion 74 includes a radially extending flange 78. The flange 78 includes apertures 80 through which appropriate fasteners such as the screws 82 can be secured to the exterior support structure 28 through its exterior surface 29. An annular sealing ring 84 can be disposed between the flange 78 and the surface 29 to provide a weather tight seal around the opening in the frame structure 28 through which the tubular housing 24 extends.

The cylindrical portion 74 of the housing 72 provides a clear view of images adjacent the outer wall of the building by reflection to the reflectors 48 and 50. The substantially hemispherical end portion 76 enables the area directly in front of the housing 24 to be viewed as shown in FIG. 4. Of course, the end portion 76 can also be formed as a wide angle lens so that a large area in front of the building can be viewed while the reflectors 48 and 50 provide a view of the area directly adjacent to the front surface of the building. In any event, the images perceived through the end portion 76 and reflected by the reflectors 48 and 50 are readily viewed through the eyepiece 44.

Having thus described the important structural features of a preferred embodiment of the present invention, it can be easily understood that the device operates to provide an occupant of a building with a substantially larger field of view than was heretofore possible at a single glance. In addition, the tubular housing 24 is made in two pieces and is easily inserted through a bore cut through a door frame, wall or the like. Moreover, the length of the housing can be easily adjusted so that the device can be installed regardless of the particular width of the wall or a door frame. Furthermore, the reflectors can be adjusted in numerous ways so that the field of view which is perceived through the device can be adapted to suit particular building structures without requiring relocation of the entire housing.

It will be understood that the stems 56 and 58 are slidable within the apertures formed by the indentations 52 and 54 so that the extent to which the reflectors extend axially past the end of the housing 24 and laterally apart from the front surface 29 is variable. Thus, if a portion of the building juts outwardly from the surface 29, one of the stems can be extended so that the the reflector can be aligned at an angle which will reflect the view past the projected portion of the building. It can also be seen that the mirror support arms 64 and 66 are slidable along the arms 60 and 62 so that the reflectors can be aligned at a position where the image reflected by one is not reflected toward the other reflector. Furthermore, the angular disposition of each reflector 48 and 50 can be changed by pivoting the reflectors about the ball and socket connection 68 and 70 respectively which secure the reflectors to the support arms 64 and 66 respectively. Preferably, the reflectors are aligned so that they reflect an image of the area directly adjacent to the building wall on either side of the device 10 as well as the area adjacent the building wall below the device 10. In this manner, any person standing flush against the building or crouched below the device 10 is still visible to the occupant.

It can also be seen that once the housing 24 has been installed and the reflectors 48 and 50 have been arranged at a predetermined angle to provide a reflected image of the area directly adjacent to the outer building wall regardless of the type of any projections which extend outwardly from the front wall, the view housing 72 is secured in place to enclose the reflectors. Accordingly, the reflectors are protected from weather conditions or attempts to vandalize or rearrange the reflectors. At the same time, the sealing rings 46 and 84 maintain a weather tight seal around the entire viewing device 10. When the end portion 76 of the view housing 72 is formed as a wide angle lens, it will be understood that substantially the entire area in front of the building can be viewed through the viewing device 10. Furthermore, although the reflectors 48 and 50 can be of any shape or size, it is preferable that the reflectors be substantially circular and have a diameter substantially less than the diameter of the tubular housing 24 so that they do not significantly restrict the straight line of sight view of the area to the front of the building. Moreover, although the position and angular disposition of reflectors 48 and 50 is widely variable, it is preferable that each is aligned to avoid reflection of the image reflected from the other. Thus, it will be understood that as shown in FIG. 4, where the reflectors are horizontally offset from the longitudinal axis of the housing 24, reflector 48 would be aligned to reflect the area to the left of housing 24, while reflector 50 would be aligned to reflect the area to the right.

Having thus described my invention, many modifications thereto will become apparent to those skilled in the art to which it pertains without departing from the scope and spirit of the present invention as defined in the appended claims.

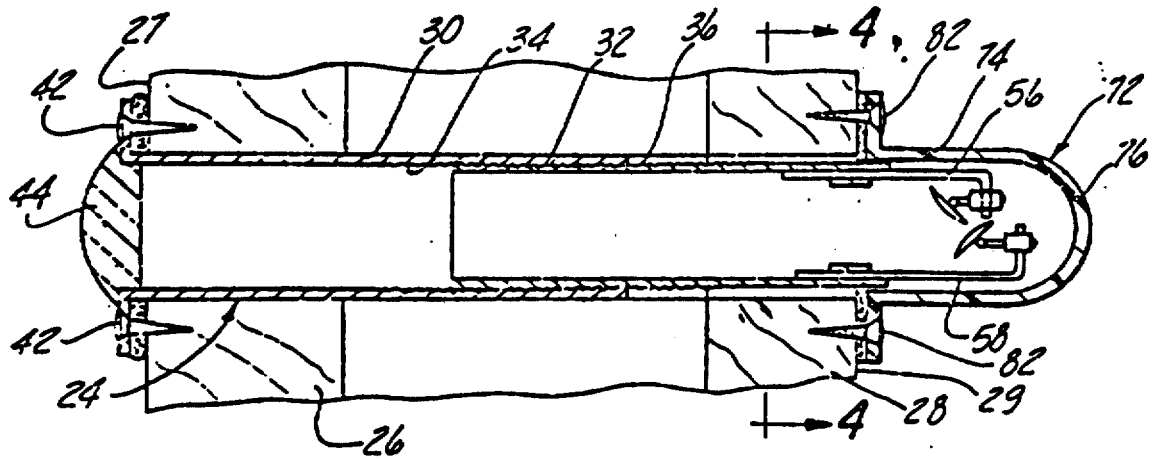

What is claimed is:

1. A viewing device comprising:
   an elongated tubular housing;
   a first reflector and a second reflector;
   means for independently, adjustably securing each of said first and second reflectors adjacent one axial end of said tube so that said first reflector extends axially outward from said tubular housing at a first predetermined angle with respect to the axis of said housing and said second reflector extends axially outward from said tubular housing at a second predetermined angle with respect to the axis of said housing, whereby each first and second predetermined angle can be independently varied;
   lens means for closing the other end of said tubular housing; and
   a transparent housing means for defining a chamber in which said first and second reflectors are disposed and enclosing said one end of said tubular housing.

2. The invention as defined in claim 1 wherein said tubular housing comprises a first tubular member and a second tubular member dimensioned to be telescopically received in said first tubular member.

3. The invention as defined in claim 2 wherein said first tubular member includes an interior threaded portion and said second tubular member includes a correspondingly threaded exterior portion.

4. The invention as defined in claim 1 wherein said first and second reflectors are mirrors.

5. The invention as defined in claim 4 wherein said mirrors are convex mirrors.

6. The invention as defined in claim 1 wherein each said reflector covers an area substantially less than the cross-sectional area of said tubular housing.

7. The invention as defined in claim 1 wherein said means for securing comprises means for securing said first reflector above the longitudinal axis of said housing and means for securing said second reflector below the longitudinal axis of said tubular housing.

8. The invention as defined in claim 1 wherein said lens means comprises a magnifying lens.

9. The invention as defined in claim 1 wherein said transparent housing means comprises a wide-angle lens.

* * * * *

UNITED STATES PATENT AND TRADEMARK OFFICE
CERTIFICATE OF CORRECTION

PATENT NO. : 4,431,277

DATED : February 14, 1984

INVENTOR(S) : Marion H. Lewandowski

It is certified that error appears in the above-identified patent and that said Letters Patent is hereby corrected as shown below:

Column 2, line 51, delete "11" and insert --12--.
Column 4, line 26, delete "the" second occurrence.

The title page and sheet 1 of the drawings containing Figs. 1, 2, 3 and 4 should appear as shown on the attached sheet.

Signed and Sealed this

Twenty-eighth Day of August 1984

[SEAL]

Attest:

Attesting Officer

GERALD J. MOSSINGHOFF

Commissioner of Patents and Trademarks

United States Patent [19]

Lewandowski

[11] 4,431,277
[45] Feb. 14, 1984

[54] VIEWING DEVICE

[76] Inventor: Marion H. Lewandowski, 10500 Whitehill, Detroit, Mich. 48224

[21] Appl. No.: 318,058

[22] Filed: Nov. 4, 1981

[51] Int. Cl.³ .............................................. G02B 23/02
[52] U.S. Cl. .................................. 350/574; 350/319
[58] Field of Search ............... 350/574, 575, 577, 453, 350/319

[56] References Cited
U.S. PATENT DOCUMENTS

| 3,558,220 | 1/1971 | Werner . | |
|---|---|---|---|
| 3,910,676 | 10/1975 | Fojtik et al. | 350/575 |
| 3,973,835 | 8/1976 | Miyakawa et al. . | |
| 4,116,529 | 9/1978 | Yamaguchi . | |
| 4,257,670 | 3/1981 | Legrand . | |

Primary Examiner—William L. Sikes
Assistant Examiner—Matthew W. Koren
Attorney, Agent, or Firm—Gifford, VanOphem, Sheridan & Sprinkle

[57] ABSTRACT

A viewing device for mounting in a wall or door frame to provide a view of the exterior of the building to an occupant of the building comprises a tubular housing and a pair of reflectors mounted by arms at one axial end of the housing so that they extend axially outward from the housing. The device further includes a transparent view housing which encloses the reflectors and prevents rearrangement of the reflectors while at the same time permitting a clear view of the area directly in front of the housing. The interior end of the tubular housing is enclosed by an eyepiece which can preferably be a magnifying type lens to increase the size of the images reflected from the reflectors and perceived through the transparent view housing.

9 Claims, 4 Drawing Figures